United States Patent [19]

Finigan et al.

[11] 4,123,911
[45] Nov. 7, 1978

[54] OIL CONTROL SYSTEM

[75] Inventors: Arthur Finigan, Guildford; Michael G. Webb, Wootton Bridge, Isle of Wight, both of England

[73] Assignee: The British Petroleum Company Limited, London, England

[21] Appl. No.: 842,164

[22] Filed: Oct. 14, 1977

[30] Foreign Application Priority Data

Oct. 20, 1976 [GB] United Kingdom ............... 43513/76

[51] Int. Cl.$^2$ ............................................. E02B 15/04
[52] U.S. Cl. ............................... 405/68; 210/DIG. 25
[58] Field of Search .................. 61/1 F, 1 R; 210/242, 210/DIG. 25, 26; 226/74

[56] References Cited

U.S. PATENT DOCUMENTS

| 3,321,923 | 5/1967 | Smith et al. | 61/1 F |
| 3,563,036 | 2/1971 | Smith et al. | 61/1 F |
| 3,608,316 | 9/1971 | Manuel | 61/1 F |
| 3,613,377 | 10/1971 | Zaugg | 61/1 F |
| 3,662,891 | 5/1972 | Headrick | 61/1 F |
| 3,713,410 | 1/1973 | Ducrocq et al. | 61/1 F |
| 3,848,417 | 11/1974 | Smith et al. | 61/1 F |
| 4,049,170 | 9/1977 | Kawakami et al. | 61/1 F |

Primary Examiner—Dennis L. Taylor
Attorney, Agent, or Firm—Morgan, Finnegan, Pine, Foley & Lee

[57] ABSTRACT

Seapack. Pack which can be attached to the deck of a support vessel comprises a deflated anti-pollution boom comprising a continuous water inflatable water chamber, a driven roller which can pull the barrier aboard the vessel and cause its deflation, means to attach a first end of the barrier to the vessel, means to inflate the gas chamber and means to inflate the water chamber.

8 Claims, 3 Drawing Figures

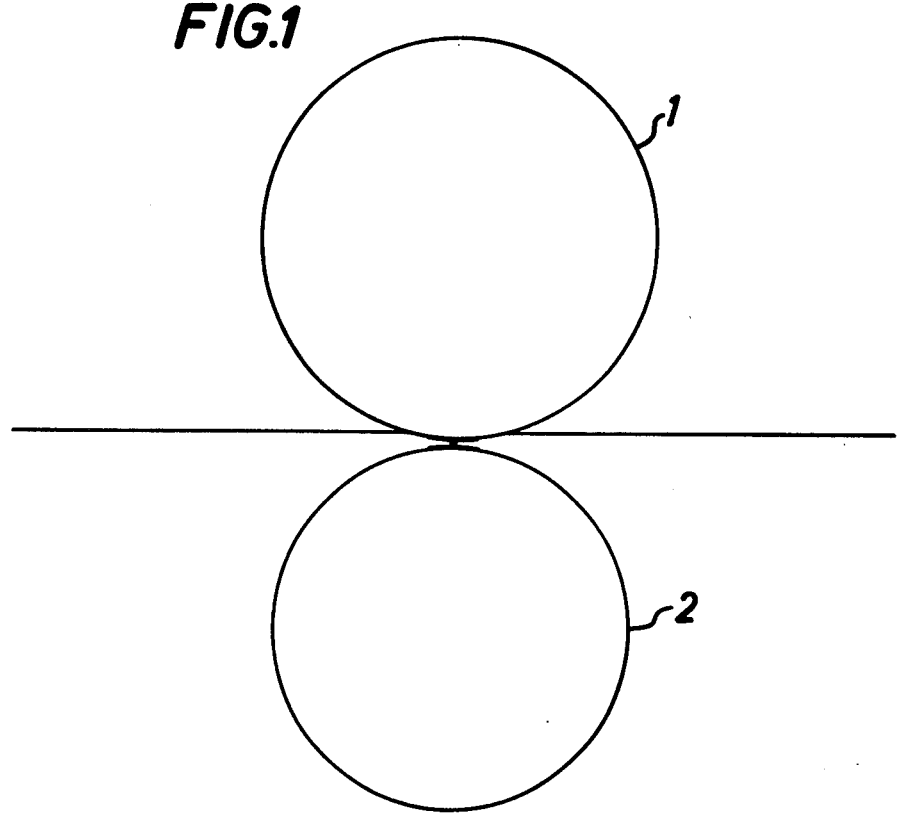

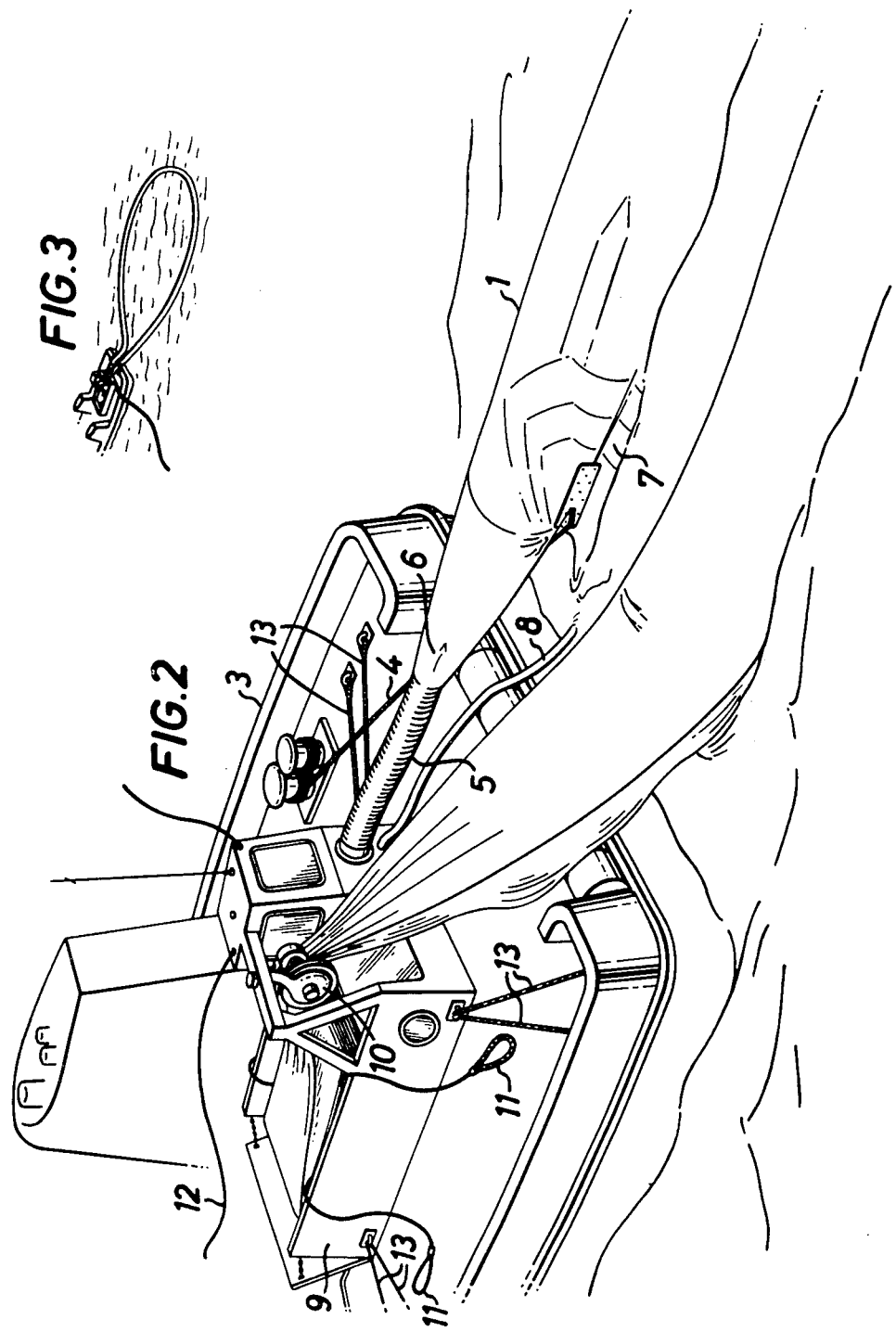

OIL CONTROL SYSTEM

The present invention relates to the control of oil on the surface of water, particularly sea-water, by means of an inflatable, flexible, floating barrier. It particularly relates to methods for deploying such a barrier from the deck of a support vessel onto the water on which oil is floating. It further relates to methods for recovering such a barrier from the surface of water onto the deck of a support vessel.

Many systems have been proposed for the containment of oil on the surface of water and many of them perform satisfactorily under suitable sea conditions. There is however the need to provide a robust system that can operate in rough sea conditions such as are frequently found in the North Sea and can at the same time be easily and rapidly deployed and then recovered at sea. There is a further need to provide a system for the control of oil on water that can be operated from existing vessels, and particularly from the various tug support vessels of the type that have been developed for use in support of the oil production platforms in the North Sea.

According to the present invention there is provided a method of deploying an inflatable, flexible, floating barrier comprising a continuous gas-inflatable gas chamber in side by side relationship to a continuous water-inflatable water chamber from a support vessel, which comprises securing a first end of the barrier to the vessel, connecting gas inflating means to said first end of the gas chamber and water inflating means to said first end of the water chamber and discharging the barrier progressively from the vessel while inflating at least the gas chamber so that the barrier does not sink, causing relative separation between the vessel and the discharged barrier so that the latter takes up a closed curved shape away from the vessel, passing the second end of the barrier to a second support vessel or an anchoring means, moving the barrier to its desired position and maintaining the gas and water inflation of the deployed barrier.

Further according to the present invention there is provided a method for the recovery of a deployed, inflated, flexible, floating barrier comprising a continuous gas-inflatable gas chamber in side by side relationship to a continuous water-inflatable water chamber, said barrier being secured to a support vessel at a first end which comprises bringing the second end of the barrier aboard the vessel over a driven roller which can pull the barrier aboard the vessel and cause its deflation, allowing gas and water to escape at the first end of the barrier and controlling the gas pressure in the air chamber so that the barrier does not sink during the recovery operation.

According to the present invention there is further provided a pack that can be attached to the deck of a support vessel comprising a deflated barrier comprising a continuous gas-inflatable gas chamber in side by side relationship to a continuous water-inflatable water chamber, a driven roller than can pull the barrier aboard the vessel and cause its deflation, means to attach a first end of the barrier to the vessel, means to inflate the gas chamber and means to inflate the water chamber. Preferably the pack is also provided with a control cabin in which the operator of the pack can carry out his functions whilst being protected from the elements.

Oil barriers comprising continuous gas and water chambers in side by side relationship are well known and are described for example in UK patent specification No. 1,188,156. Essentially such barriers have an elongated gas chamber which keeps them afloat and, in side by side relationship, an elongated water chamber which gives the boom adequate stability. The preferred barrier comprises a single water chamber and a single gas chamber and therefore has a figure of eight cross section. There is however no reason why barriers should not have more than one gas chamber or more than one water chamber apart from the extra complexity that this involves. The chambers are preferably substantially circular in cross section when fully inflated.

In this specification the verb "to inflate" is used to designate the admittance of both gas and water, as appropriate, and in both cases it implies the right quantity to confer the desired mechanical properties on the inflated barrier. Preferably the gas chamber is inflated with air and the water chamber with sea water.

The barriers may be made from any suitable flexible material which is water or gas proof as necessary. Rubberised fabrics such as neoprene coated nylon are particularly valuable as they are sufficiently gas and waterproof and have good tensile properties.

It is an essential part of the deployment process to secure one end of the barrier to the support vessel. During deployment and subsequently in use there is considerable pull on the secured end of the barrier and therefore it is important to ensure that the point or points of attachment on the barrier are of sufficient strength to withstand the strains to which they will be subjected. Suitably an attachment plate is fitted to the barrier at the end by which it is to be secured to the support vessel. In one embodiment the point of attachment on the boom comprises two metal plates bolted together on either side of the seam joining the air chamber to the water chamber at an appropriate place at or near one end of the barrier.

As stated above the gas chamber in the barrier is most suitably inflated by air and this can be achieved by means of an air pump powered by compressed gas, e.g. an air entrainment device such as an ejector or a Coanda nozzle (which is an air entrainment device described in British patent specification No. 829,065 and in an article published in "Scientific American" June 1966, pages 84 to 92). Inflation air may also be conveniently provided by means of a suitably sized fan blowing directly into the gas chamber of the barrier.

Once deployment has started it is convenient to arrange that the open end of the water-inflatable chamber is under water so that sea water can be directed into it by means of a suitable propeller. If desired the water can be forced into the water chamber of the barrier by pumping a small quantity of water into the chamber at high pressure through a suitable venturi device which entrains large volumes of water from the surrounding sea into the water chamber.

The power requirements for the inflation of the barrier are preferably taken from a suitable source of power on the support vessel. Frequently support vessels have generators aboard which can supply an adequate quantity of power in the form of electricity and thus it is preferred to power the pack according to the present invention by electrical means, i.e. the fan to force air into the air chamber and the pump to force water into the water chamber are preferably electrically operated.

Once the first end of the barrier has been secured to the support vessel the barrier can be fed from the support vessel into the sea. It is essential during this operation to inflate at least the air chamber of the barrier so that it does not sink during the deployment operation. It is important to ensure that there is relative movement between the vessel and the barrier fed into the sea during deployment so that the barrier can float away from the vessel as it is discharged. In this way it takes up a closed curved shape away from the vessel. The rate of discharge of the barrier from the vessel is principally governed by the rate at which the air chamber can be inflated in order to maintain the barrier afloat and help prevent it becoming twisted during the deployment operation.

It is preferred to commence inflation of the water chamber of the barrier at the same time as the inflation of the gas chamber. Most suitably the barrier is discharged over the stern of the support vessel which maintains a slow speed ahead during the discharge operation and thus reduces the risk of the barrier becoming twisted.

Once the barrier has been fully discharged from the support vessel its second end, i.e. the end which is not secured to the support vessel, is transferred to a second vessel or attached to a drogue or some similar means of stationing this end of the barrier in the sea. The support vessel can then move away from the second vessel or from the drogue, or the second vessel can move away from the first vessel in order to deploy the boom to its desired position. The inflation of the barrier is maintained from the support vessel at all times as necessary in order to maintain the barrier in its correct operating form.

In order to recover a barrier from the sea, the second end of the barrier, i.e. that end which is not secured to the support vessel in operation, is brought to the support vessel and fed over a driven roller which can then pull the barrier aboard the support vessel. As the barrier is pulled over the driven roller the water and gas are driven from their respective chambers and are allowed to escape at the first end of the barrier, i.e. the end of the barrier secured to the support vessel. It is important to control the rate of loss of air through the first end of the air chamber so that the barrier remains floating during the recovery operation. In order that the driven roller shall grip the barrier it may be necessary to mount it at a high level on the pack in the support vessel. In a preferred embodiment the second end of the barrier is fed aboard the vessel to a pair of co-operating rollers which grip the barrier and ensure its rapid recovery while at the same time positively forcing the water and the air from their respective chambers in the barrier. When the barrier is pulled between one or more pairs of co-operating rollers there is less tendency for the grip on the barrier to slip and as a result the rollers can be mounted at a lower level in the pack.

The present invention is illustrated in the drawings accompanying the Provisional Specification in which:

FIG. 1 is a cross section of a typical oil barrier when fully inflated,

FIG. 2 is a representation of the pack according to the invention during deployment of the barrier and FIG. 3 shows the closed curved shape taken up by the barrier during the discharge of the barrier from the pack on the support vessel.

In the drawings 1 is the gas chamber which is in side by side relationship with the water chamber 2. Turning specifically to FIG. 2 the first end of the barrier is secured to the support vessel 3 by means of the cable 4. The air chamber 1 is connected via the flexible hose 5 to a fan within the pack which forces air into the chamber as indicated by the arrow 6. The water chamber is just seen above the level of the water at 7 and its open end is arranged below the level of the water in association with a hydraulically driven water pump. The hydraulic fluid is supplied to the pump through hose 8. Both air and water are driven into the barrier during its deployment.

The deflated barrier is shown folded flat in the container 9. From this container it is fed via the pully system 10 over the stern of the support vessel into the sea. The pully system is mechanically driven and feeds the boom into the sea while at the same time sealing it sufficiently to prevent water and particularly air that it is being driven into the open end of the barrier from passing through into the deflated section in container 9. Similarly when the barrier is being recovered the pully system 10 grips the barrier and pulls it from the sea while at the same time causing its deflation both with respect to the air in the air chamber and water in the water chamber. When the barrier has been fully discharged the lifting straps 11 attached to the closed end of the barrier can be either attached to a drogue or passed to a second vessel so that the two ends of the barrier can be separated in order to deploy it in the desired position.

FIG. 3 is a diagrammatic representation of the support vessel and the fully discharged barrier, the closed end of which is ready to be passed to a second support vessel or to be attached to a drogue.

All the power requirements of the pack namely the power to drive the air fan and the hydraulically driven water pump and the power rollers for the deployment and recovery of the boom, are taken from the electrical power supply on the support vessel via a cable 12. The pack itself is firmly attached to the support vessel via cables 13.

We claim:

1. A method for deploying an inflatable, flexible, floating barrier comprising a continuous gas-inflatable gas chamber in side by side relationship to a continuous water-inflatable water chamber from a support vessel, which comprises securing a first end of the barrier to the vessel; connecting gas inflating means to said first end of the gas chamber; connecting a venturi device to said first end of the water chamber; positioning the open end of said water inflatable chamber under water so that by pumping a small quantity of water into the chamber at high pressure through the venturi device thereby entrains large volumes of water from the surrounding sea into the water chamber; and discharging the barrier progressively from the vessel while inflating at least the gas chamber so that the barrier does not sink; causing relative separation between the vessel and the discharged barrier so that the latter takes up a closed curved shape away from the vessel; passing the second end of the barrier to a second support vessel or an anchoring means; moving the barrier to its desired position and maintaining the gas and water inflation of the deployed barrier.

2. A method for deploying an inflatable, flexible, floating barrier according to claim 1 wherein the barrier is subsequently recovered by bringing the second end of the barrier aboard the support vessel over a driven roller which can pull the barrier aboard the vessel and cause its deflation, allowing gas and water to escape at the first end of the barrier and controlling the gas pressure in the air chamber so that the barrier does not sink during the recovery operation.

3. A method according to claim 1 wherein the gas chamber is inflated by an air pump powered by compressed gas, or a fan.

4. A method according to claim 1 wherein inflation of the water chamber of the barrier is commenced at the same time as the inflation of the gas chamber.

5. A method according to claim 1 wherein the barrier is discharged over the stern of the support vessel which maintains a slow speed ahead during the discharge operation, thereby reducing the risk of the barrier becoming twisted.

6. A method according to claim 2 wherein, in the recovery step, the second end of the barrier is fed aboard the recovery vessel to a pair of co-operating rollers which grip the barrier and ensure its rapid recovery while at the same time positively forcing the water and the air from their respective chambers in the barrier.

7. A pack, suitable for attachment to the deck of a support vessel, comprising a deflated barrier of neoprene coated nylon fabric comprising a continuous gas-inflatable gas chamber in side by side relationship to a continuous water-inflatable water chamber, said barrier having an attachment plate fitted to the end thereof by which it is to be secured to the support vessel, a driven roller that can pull the barrier aboard the vessel and cause its deflation, means to attach a first end of the barrier to the vessel, means to inflate the gas chamber and means to inflate the water chamber.

8. A pack according to claim 5 wherein the attachment plate comprises two metal plates bolted together on either side of the seam joining the air chamber to the water chamber.

* * * * *